United States Patent [19]

Celi, Jr. et al.

[11] Patent Number: 5,742,797

[45] Date of Patent: Apr. 21, 1998

[54] DYNAMIC OFF-SCREEN DISPLAY MEMORY MANAGER

[75] Inventors: Joseph Celi, Jr., Boynton Beach; Roger Louie, Deerfield Beach; Jonathan Mark Wagner, Coral Springs, all of Fla.

[73] Assignee: International Business Machines Corporation, Armonk, N.Y.

[21] Appl. No.: 513,710

[22] Filed: Aug. 11, 1995

[51] Int. Cl.⁶ .................................................... G06T 1/60
[52] U.S. Cl. .............................. 395/507; 395/497.01
[58] Field of Search ............................ 345/185, 189, 345/200, 201, 203; 395/507, 497.01, 497.02, 509, 520, 492, 497.04, 497.03

[56] References Cited

U.S. PATENT DOCUMENTS

| | | | |
|---|---|---|---|
| 4,742,474 | 5/1988 | Knierim | 345/187 |
| 4,906,985 | 3/1990 | Furlong | 345/189 |
| 4,983,958 | 1/1991 | Carrick | 345/190 |
| 5,083,121 | 1/1992 | Nomura et al. | 345/200 |
| 5,132,992 | 7/1992 | Yurt et al. | 375/240 |
| 5,206,859 | 4/1993 | Anzai | 370/522 |
| 5,291,188 | 3/1994 | McIntyre et al. | 345/189 |
| 5,309,173 | 5/1994 | Izzi et al. | 345/190 |
| 5,319,395 | 6/1994 | Larky et al. | 345/190 |
| 5,335,322 | 8/1994 | Mattialo | 395/511 |
| 5,361,387 | 11/1994 | Millar et al. | 395/511 |
| 5,392,415 | 2/1995 | Badovinatz et al. | 395/406 |
| 5,408,650 | 4/1995 | Arsenault | 395/704 |
| 5,414,826 | 5/1995 | Garcia | 395/428 |
| 5,561,786 | 10/1996 | Morse | 395/497.01 |
| 5,592,670 | 1/1997 | Pletcher | 395/670 |
| 5,606,657 | 2/1997 | Dennison et al. | 395/501 |

OTHER PUBLICATIONS

IBM Technical Disclosure Bulletin "Linked List Search Table Array for Free Storage Blocks" vol. 33 No. 8 pp. 474–479, Jan. 1991.

S.L. Goncharsky et al. "Use of Binary Trees for Storage Allocation" IBM Technical Disclosure Bulletin vol. 24 No. 6 pp. 2710–2711, Nov. 1981.

S.L. Goncharsky et al. Use of Binary Trees for Storage De-allocation IBM Technical Disclosure Bulletin vol. 24 No. 6 p. 2713, Nov. 1981.

*Primary Examiner*—Kee M. Tung
*Attorney, Agent, or Firm*—Mark S. Walker; Andrew J. Dillon

[57] ABSTRACT

A display memory manager allocates and deallocates off-screen video memory by dividing the memory space into a plurality of lapping and non-overlapping regions each capable of storing a different amount of digitized display data, and creating a linked list data structure indicative of the allocated and unallocated regions and various combinations of the unallocated regions. Upon receiving a request for off-screen display memory the display memory manager traverses the linked list data structure searching for a region, or combination of regions, large enough to store the requested amount of digitized display data. Once a region or combination of regions has been found and allocated, the linked list data structure is updated to indicate that the new regions are now allocated and hence unavailable to a subsequent requested allocation unless deallocated.

21 Claims, 7 Drawing Sheets

DYNAMIC OFF-SCREEN DISPLAY MEMORY MANAGER

CROSS-REFERENCES TO RELATED APPLICATIONS

This application contains subject matter related to a co-pending, commonly assigned U.S. patent application designated Ser. No. TBD, filed even date herewith, entitled "Method and Apparatus for Virtualizing Off-Screen Memory of a Graphics Engine".

TECHNICAL FIELD

The present invention is directed to a memory management system, and more particularly to a display memory management system for dynamically allocating and deallocating regions of off-screen display memory in a multi-media personal computer system.

BACKGROUND OF THE INVENTION

The past decade was a revolutionary time in computing. The advent and proliferation of personal computers has transformed the computer environment from one of large mainframe computer systems which were highly centralized and tightly controlled, to a network of interconnected personal computers and workstations which are often widely distributed, yet easily accessible, via computer networking.

Concomitant with this change in computer environments is the significant expansion in the types of computer application programs. In the past, computers provided, primarily accounting, data reduction, and data-base management functions. In addition to these applications, computers now provide voice messaging, games and multimedia applications for business and educational use. While older computer application programs could be accommodated using computer systems capable of displaying only text type data, the new computer application programs require computer systems capable of displaying graphical, audio and video data to create today's multi-media environments.

Unlike text information, graphical and in particular video and audio data require significant amounts of data storage. As an example, to display a color video image on a computer monitor a large amount of digital storage is required to store the digitized data indicative of the color image in comparison to text information.

Figure 1:
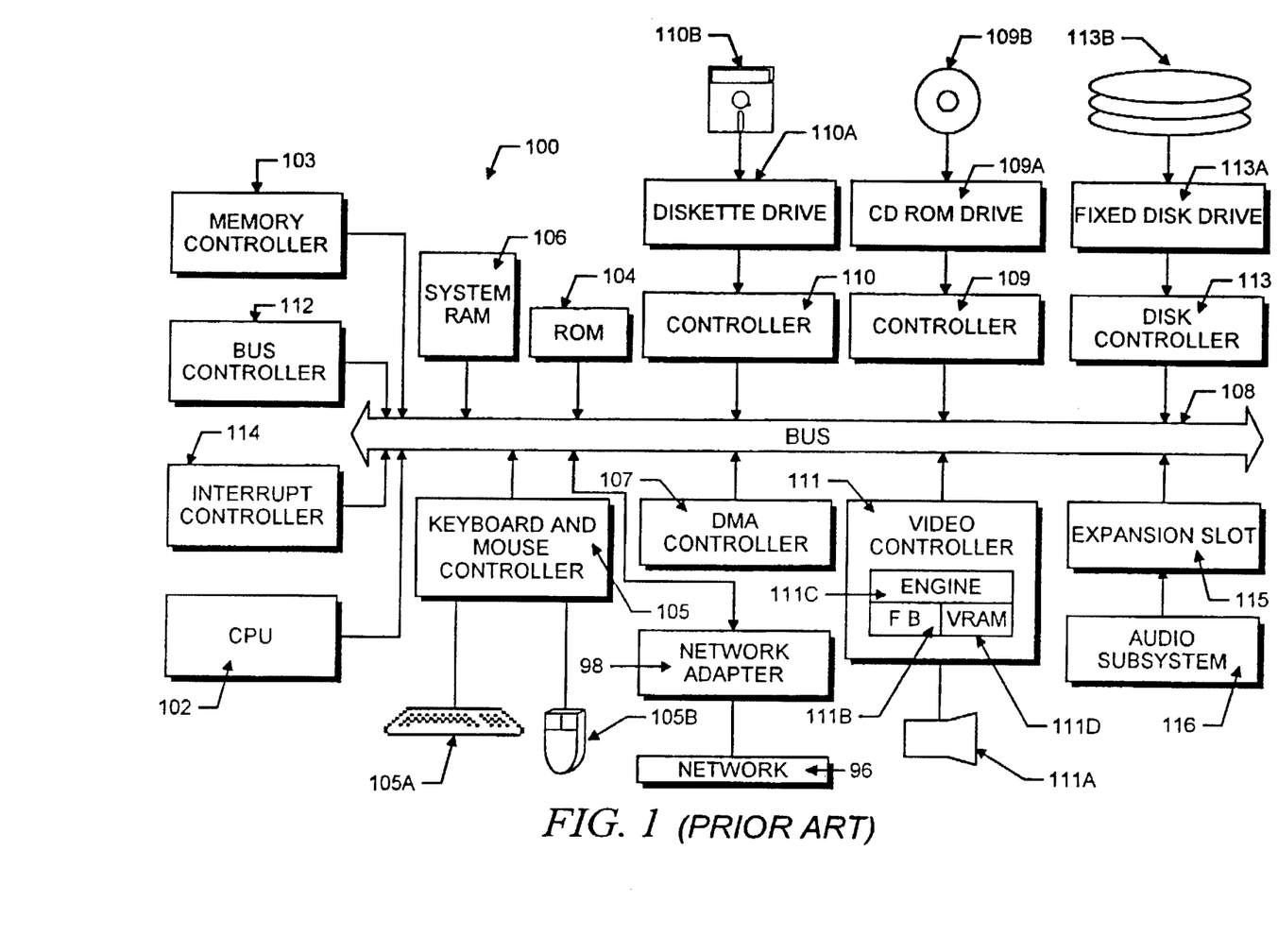
FIG. 1 is an illustration of a block diagram of a video capable computer system.

FIG. 1 illustrates a well known system architecture for a multi-media capable computer system 100, such as an IBM PS/2® personal computer ("PC"). The computer system 100 includes a central processing unit (CPU) 102 which includes a microprocessor (e.g., a 80×86, a Pentium, PowerPC, etc. ...), read only memory (ROM) 104 and random access memory (RAM) 106. The computer system also includes a memory controller 103 which controls system RAM 106, a bus controller 112 which controls a system bus 108, and an interrupt controller 114 which is used for receiving and processing various interrupt signals.

Mass storage may be provided by a diskette 110B, a CD-ROM disk 109B or a hard disk 113b. The diskette 110B can be inserted into a diskette drive 110A, which is, in turn, connected to the system bus 108 by a disk driver controller 110. Similarly, the CD-ROM disk 109B can be inserted into a CD-ROM drive 109A, which is also connected by a controller 109 to the system bus 108. Finally, hard disks 113B are part of a fixed disk drive 113A, which is also connected to the bus 108 by a controller 113.

Input and output to computer system 100 is provided by a number of devices. For example, a keyboard and mouse controller 105 connects to the bus 108 for controlling a keyboard input device 105A and a mouse input device 105B. A DMA controller 107 is provided for performing direct memory access to system RAM 106. The computer also includes a video controller 111 which controls the display of information on a display 111A (e.g., a CRT or flat screen). The display 111A, under the control of the computer system 100, generates a two dimensional array of picture elements ("pixels"), which may be independently controlled to form an image. Other input and output devices, such as an audio subsystem 116, may be connected to the system through an expansion slot 115.

The computer 100 is generally controlled and coordinated by operating system software. OS/2® is an exemplary operating system, which is developed and sold by the International Business Machines Corporation ("IBM"), Boca Raton, Fla., the assignee of the present invention. Conventional operating systems control and schedule computer processes for execution, perform memory management, provide file system services, provide networking and I/O services, and provide a user interface, such as a graphical user interface ("GUI"). User applications programs, such as text editors and spreadsheets, directly or indirectly, rely on these and other operating system capabilities to properly use the computer system.

In recent years with the development of graphical user interfaces and their widespread acceptance, the display of information to a user has become relatively sophisticated and computationally demanding. Modern computers use "graphics" capabilities to produce various graphical items, such as lines, boxes, and circles, on the display 111A, possibly in color. These graphics capabilities may be used, for example, to display information within a "window" displayed on the display 111A using a GUI (e.g., the Presentation Manager™ GUI which runs with the OS/2 operating system).

In addition to graphics, modern computers are increasingly using multimedia techniques, which store, organize, and display various forms of data, including textual data, digital audio data, digital video data, and digital musical data. For example, a computer using multimedia techniques may play back video data and audio data to produce a movie clip video sequence on the display 111A with synchronized audio output from the audio subsystem 116.

Graphical displays and video images are conventionally produced by storing data for each pixel of the display 111A in a corresponding location of a "frame buffer" 111B. A typical frame buffer 111B is constructed in a well known manner from special memory chips called video random access memory (hereinafter "VRAM"), which allows conventional read and write operations to be performed to memory cells of the VRAM on one port, while allowing data to be scanned out from the cells via a second, scan port. The display controller 111 typically scans the data out and uses it to cause corresponding pixels of the display 111A to be energized in accordance with the display data.

The display data may indicate whether or not a pixel should be illuminated, or if color images are involved, may indicate the desired luminance and chrominance for a pixel. Moreover, color data may be implemented according to a variety of well known formats, such as YUV, RGB, RBG, etc., which require many bits of data per pixel. Modern color formats, for example, may require up to three bytes, or twenty four bits, of information per pixel.

Producing graphical and video images requires a substantial amount of system resources. Even relatively simple graphical items, such as lines and circles, may require considerable computation to determine which pixels should be illuminated. For example, the well known algebraic line equation, y=mx+b, is typically unsuitable for use as a graphics equation because it often yields a line having an appreciable "staircase effect." Consequently, over the years, mathematicians and designers have developed "graphics equations" peculiarly suited to the needs of a discrete, pixel-oriented display 111A. Though these equations yield higher quality graphic items, they are computationally intensive.

Animated video may involve relatively less computation, but usually requires considerably more storage resources and system bus 108 bandwidth. Animated video is produced by displaying a sequence of video frames at a sufficient playback rate, such as fifteen video frames per second, to yield a relatively continuous image.

Because a typical a video frame may involve thousands to millions of pixels, the storage and bandwidth problems quickly become critical. To help alleviate the storage and bandwidth burdens, special video data formats and compression and decompression techniques have been developed. With such systems, compressed video data are retrieved from the system RAM 106. There, the compressed data may be decompressed by a software decompression routine (not shown). Afterwards, the decompressed data is placed in the frame buffer 111B for display. In some cases, the decompressed data is "stretched" a predefined amount by a software stretch routine, and the stretched image is placed in the frame buffer 111B. In a well known manner, stretching techniques allow a smaller image to be stored in off-screen video memory, and retrieved and a larger image before being placed into the frame buffer to be displayed.

IBM has developed the Ultimotion™, an all software, full motion video data system, which, among other things, provides software routines to compress, transmit and decompress frames of video data according to the Ultimotion data format. Each video frame may be either an "intra" frame or a "delta" frame. An intra frame is representative of an entire image to be displayed. A delta frame is representative of only changes to the prior image frame. Though Ultimotion and other systems have alleviated some of the system resource requirements associated with motion video, a substantial amount of resources are still required, such as off-screen VRAM.

To support the demands for enhanced graphics and video in today's computer systems, a considerable effort has been made in developing graphic engines 111C to further reduce the computational burden placed on the CPU 102 and the system bus 108. Typically, the graphics engine 111C (also often referred to as a "graphics coprocessor", or a "graphics accelerator") includes its own internal display memory and special purpose hardware to determine which pixels should be energized in response to a graphics command and to store the appropriate display data in the frame buffer 111B. For example, the graphics engine 111C may have special hardware (i.e., a dedicated integrated circuit) to implement a graphics line equation to determine which pixels should be energized to display a line, in response to a command to draw a line. Conventional engines 111C typically further include functionality to draw circles and rectangles, as well as having the capability to fill areas with color and "clip" images. Besides freeing the CPU 102 from having to perform the computational operations involved with the graphics equations, the engine 111C frees the system bus 108 from having to transfer considerable amount of display data to the frame buffer 111B.

The amount of display memory required for the frame buffer 111B depends upon the number of pixels on the display 111A and the amount of data required for each pixel. Often, the engine includes more display memory than is needed for the frame buffer 111B. Although this "extra" display memory capacity may be implemented in VRAM, DRAM, SRAM, or other memory technology, the extra capacity is typically, collectively called "off-screen VRAM."

Off-screen VRAM 111D, like the frame buffer 111B, is proximal to graphics engine 111C and may transfer data to and from the graphics engine without using the system bus 108. Consequently, the engine 111C may access data more efficiently in off-screen VRAM 111D than data in system RAM 106, because the engine 111C does not incur the performance penalty associated with using the bus 108 and CPU to retrieve data. This aspect is often exploited to improve performance by a technique called "caching." The more often particular data are used by engine 111C, the greater the performance advantage of caching, or storing, that data in off-screen VRAM 111D. Typically, mouse cursor information or font information is cached. Newer techniques, discussed in the detailed description, also exploit the performance advantage associated storing data in off-screen VRAM 111D.

Although the cost per bit of computer memory has dropped significantly in the past several years, the off-screen memory storage requirements for new software multimedia applications packages has grown significantly primarily due to the growing use of video and audio capable personal computer systems.

However, the prior art techniques for allocating and deallocating regions of off-screen VRAM 111D are less than desirable to ensure that off-screen VRAM is used as efficiently as possible.

As an example, prior art off-screen video memory management techniques have generally managed the allocation of regions (i.e., addressable areas) of the display memory using a static allocation process which performs the allocations at compile time. Compilation time is the event of translating the source code as written by the programmer into machine executable format. As expected by virtue of its name, a disadvantage with static allocation is that the allocations of video memory when made at compile time remain inflexible even as the requirements for video memory change due to computation.

To efficiently utilize the amount of video memory available in a computer system, a memory manager system must allocate off-screen video memory in a more efficient manner to ensure proper utilization of the valuable off-screen portion of the video memory.

SUMMARY OF THE INVENTION

An object of the present invention is to locate and deallocate off-screen display memory in a manner which optimizes the amount of available display memory in a computer system.

According to the present invention a display memory manager allocates and deallocates off-screen display memory in response to allocation and deallocation requests, by dividing the memory space into a plurality of non-overlapping regions each capable of storing a different amount of video data indicative of a video image, and creating a linked list data structure indicative of the allocated and unallocated regions and various combinations of the unallocated regions. Upon receiving a request for memory, the memory manager traverses the linked list data structure searching for a region or combination of regions large enough to store the requested mount of display data. Once a region or combination of regions has been found and allocated, the linked list data structure is updated to indicate that the new region or regions are now allocated and hence unavailable to a subsequent requested allocation unless deallocated.

The display memory manager of the present invention maintains a "snap shot" of: 1) the region in the off-screen display memory space which are currently allocated for storing video information, 2) the unallocated regions in the off-screen display memory and 3) the various combinations of the unallocated regions in off-screen display memory. Information indicative of each allocated and unallocated region, and the combination of unallocated regions is maintained in a linked list data structure. Each element in the linked list is associated with a region or combination of regions and each element contains fields indicative of the region's starting address, its size and whether or not the region is currently allocated.

Upon receiving a request for a region of off-screen display memory, the display memory manager determines the region in display memory which is the best fit for the information to be stored. The memory region of best fit is determined by traversing the linked list structure which is organized from smallest available sized region to largest sized memory region or combination of region. Starting with the smallest region, the display memory manager checks the elements of the list arranged according to size in sequential ascending order. Once the smallest unallocated region of sufficient size has been found the region is allocated.

By arranging the linked list elements starting with the smallest region to the largest, traversing through the list in sequential order ensures that the selected region is the best fit for the new information to be stored.

The linked list may be a singularly linked list since the preferred process for determining the region of best fit involves starting with the first element and sequentially checking as necessary the elements associated with large regions. However, a doubly linked list may also be used if one wishes to use a different search process to determine the region of best fit. The use of a doubly linked list may in fact facilitate inserting, deleting and reorganizing the elements in the list since each element in the list will include two pointers, one to each adjacent element.

The present invention is applicable to bit-mapped, pixel packed and other display formats.

The display memory management system of the present invention results in efficient utilization of the available display memory space due to its dynamic and efficient allocation/deallocation process for multitasking operating systems.

By controlling the allocation and deallocation of display memory, arbitration of the memory is inherently performed.

These and other objects feature and advantages of the present invention will become more apparent in light of the following detailed description of a preferred embodiment thereof, as illustrated in the accompanying drawings.

DETAILED DESCRIPTION

Figure 2:
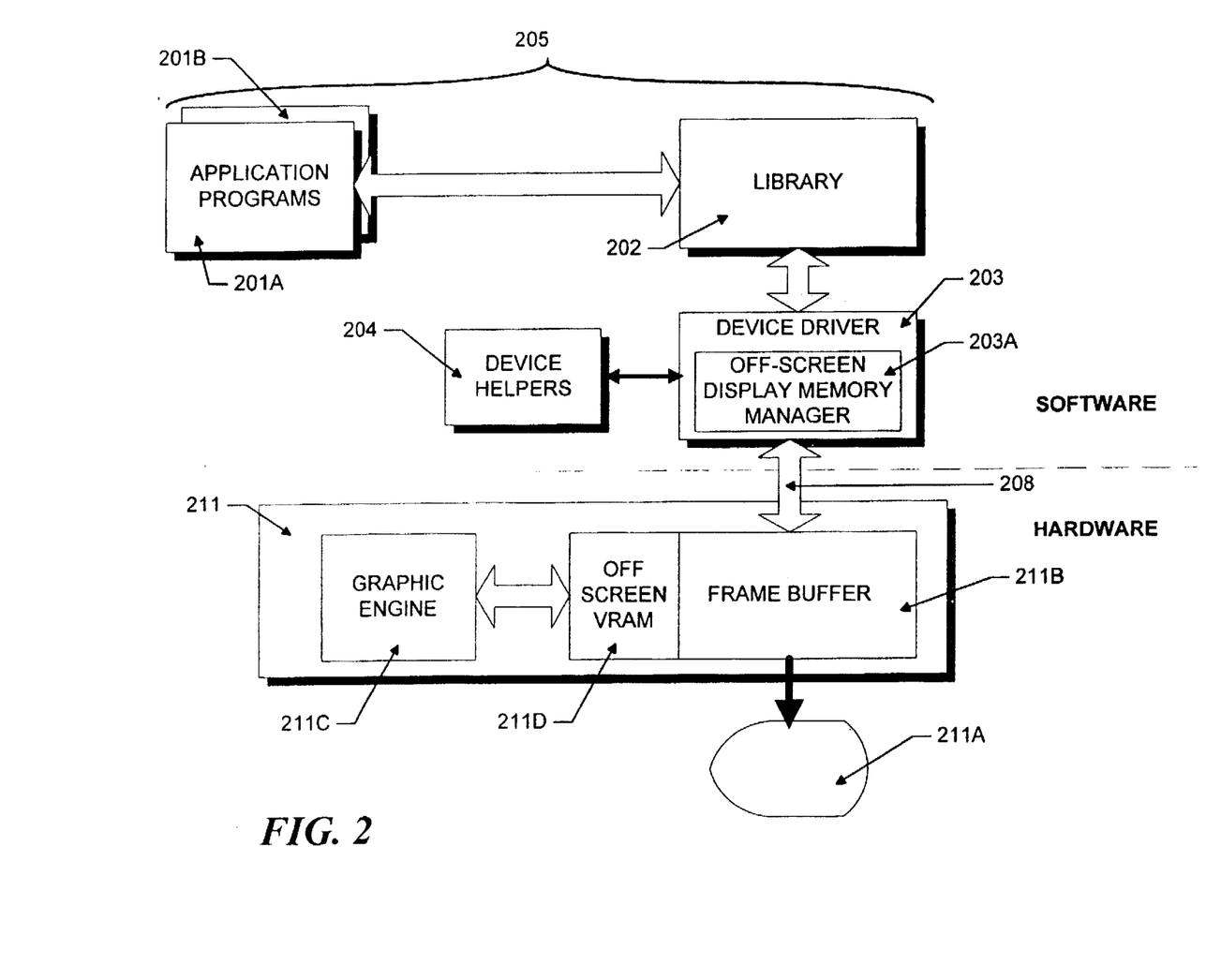
FIG. 2 is an illustration of functional block diagram of some of the computer system components involved in displaying information on the computer system.

FIG. 2 is an illustration of functional block diagram of some of the computer system components (hardware and software) involved in displaying information on the computer display 111A. The components are preferably embodied in a multimedia capable computer system, such as the computer system shown in FIG. 1, executing OS/2™, or a similar multi-tasking operating system. The system generally includes a plurality of application programs 201A, 201B, . . . which are executed in the CPU 102.

More particularly, the application programs 201 may include a word processing program having text data, a spread sheet package with graphics, and a video editing package which displays video images on the display. While executing, the application programs may invoke in a well known manner various software routines from a software library 202. The routines within the library 202, in turn, communicate with a device driver 203 which is a hardware specific software routine responsible for communicating with a display controller 211 (e.g., a super VGA card). The display controller 211 includes a graphic engine 211C, off-screen display memory 211D (e.g., VRAM), and a frame buffer 211B (also referred to as on-screen VRAM). As known, the frame buffer 211B is sequentially scanned by the controller 211 to provide a graphical or animated image on the display 211A.

The software library 202 includes routines that are commonly needed by application programs 201. As such, application program development is facilitated, became an application developer does not have to design, develop, test, and debug routines that are commonly needed, such as decompression routines, color conversion routines, software implementations of graphics equations, and the like. The developer need focus only on the peculiar aspects of the application program being developed.

If necessary, the application programs 201 need not use library 202, but instead may directly communicate with the device driver 203, if the applications 201 have the appropriate system privileges. To better focus the remaining description on the various aspects of the invention, the combination of the application programs 201 and the library 202 will hereinafter be referred to as "requesting software" 205.

The device driver 203 is hardware-specific software that communicates with display controller 211. The device driver 203 includes a set of entry points, or "exports," at which the driver 203 may be invoked, or called. Each entry point has an associated software routine that corresponds to a particular function performed by the driver 203. For example, according to the present invention the driver 203 includes an entry point to an off-screen display memory manager routine 203A dedicated to allocating and deallocating regions of off-screen VRAM 211D.

Each routine associated with an entry point expects to receive certain "in parameters" as part of the call; likewise, the calling code, e.g., the requesting software 205, expects to receive certain "out parameters" from the routine, as well as expecting that the routine will "return" with return codes according to a predefined interface. The return code may indicate that an error was encountered, that the request was successfully serviced, or that the request was partially serviced.

Device driver 203 may use known device "helper" routines 204 in order to perform its tasks. Helper routines 204 are provided by many operating systems, including OS/2, to facilitate the development of device drivers, by providing commonly needed routines. In this respect, they are somewhat analogous to the library 202 discussed above.

According to the present invention, software 205 requests a region of buffer memory, or a contiguous portion of off-screen VRAM 211D, by calling the off-screen display memory manager 203A which controls the allocation and deallocation of off-screen display memory (e.g., VRAM). The "in parameters" for this entry point may include a function code indicating whether a buffer is being requested or deallocated, the desired size of the buffer, a buffer id, the requester handle, and the type of buffer desired. The "out parameters" from the routine may include the size of the allocation actually performed and an off-screen VRAM address.

The allocation call may be made during initialization of one of application programs 201, for example. As suggested above, the buffer, once allocated, may be used by the requesting software 205 to improve performance by caching cursor information, or storing decompressed, video data, for example.

The data stored in the off-screen display memory is generally indicative of an image in a compressed format, and contains a plurality of pixels which are bit-mapped. If the image is non-gray scale monochrome, the bit mapped image can be represented simply as a two dimensional image since each pixel needs only one bit of information to indicate whether the pixel is on or off (i.e., illuminated or not illuminated). However, if the image is either a gray scale image or a color image, several bits are required to represent each pixel location. As an example, in a monochrome system having 256 shades of gray or a color system having 256 color modes, eight bits are required for each pixel location.

Figure 3:
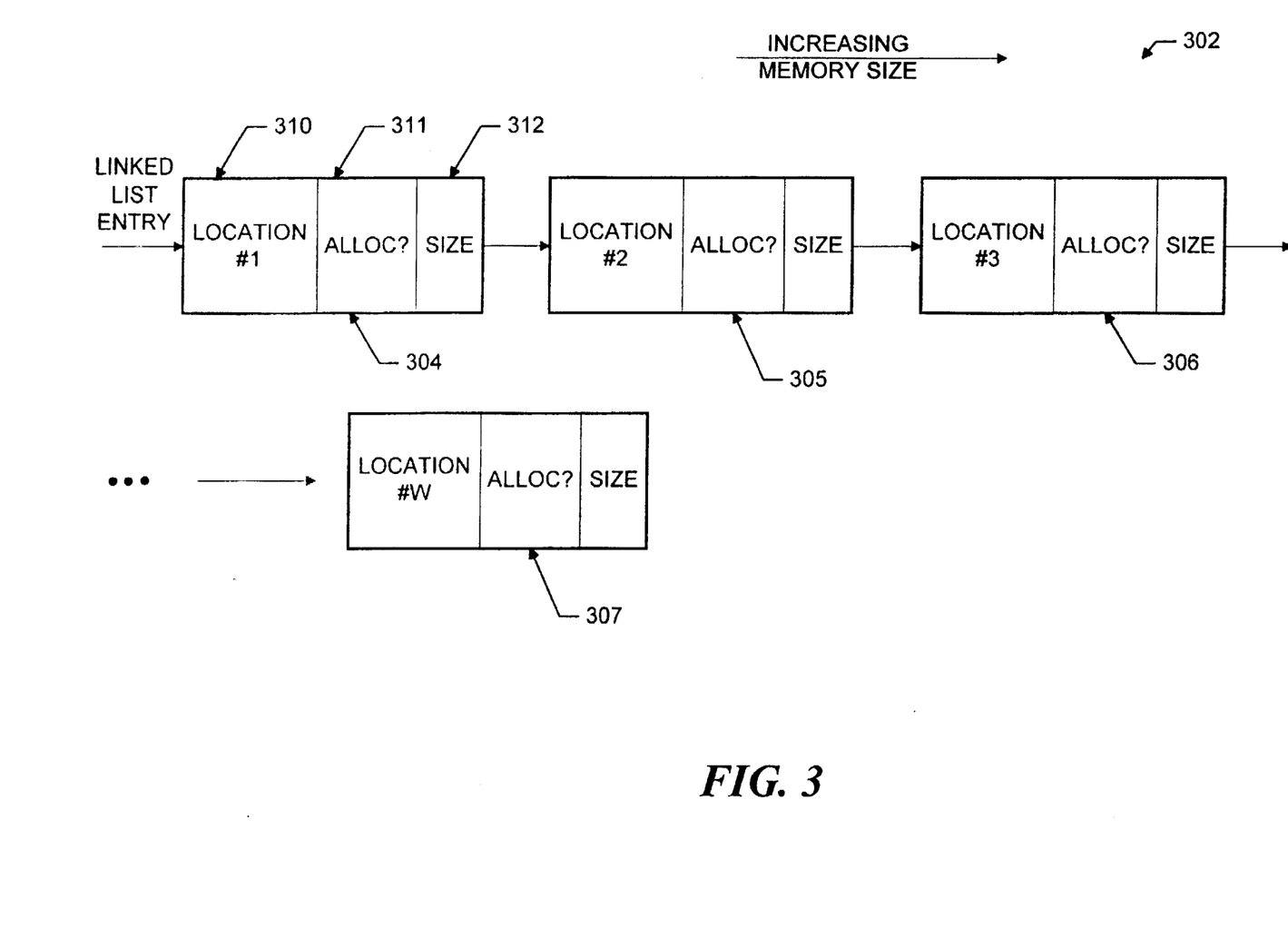
FIG. 3 illustrates a linked list data structure containing several fields of information indicative of each allocated and unallocated region in off-screen video memory.

FIG. 3 illustrates a linked list 302 with a plurality of elements 304–307 each containing several fields 310–312 of information indicative of each allocated and unallocated region in off-screen display memory 211D (FIG. 2). Each element 304–307 in the linked list 302 corresponds to a specific region or combination of regions in the off-screen display memory 211D and contains fields 310–312 indicative of the region location in memory space, whether the region is allocated or not, and the size of the region respectively. The elements 304–307 of the linked list are arranged from smallest region to largest region or combination of regions. The linked list is preferably a singly linked list, but one of ordinary skill will realize that a doubly linked list may also be used.

Upon receiving a request for a region of off-screen display memory, the off-screen display memory manager 203A determines the region in off-screen display memory 211D which is the best fit for the information to be stored. The memory region with the best fit is determined by traversing the linked list 302 structure which is organized according to region size from smallest available sized region to largest sized memory region or combination of regions. Starting with the smallest region, which is the first element 304 in the linked list, the off-screen display memory manager 203A checks the elements of the linked list in ascending order arranged according to region size. Once an unallocated region of sufficient size has been found, the region is allocated. By arranging the regions according to size starting with the smallest region, a traversal through the linked list 302 in this order ensures that the selected region is the best fit for the new information to be stored.

Figure 4A:
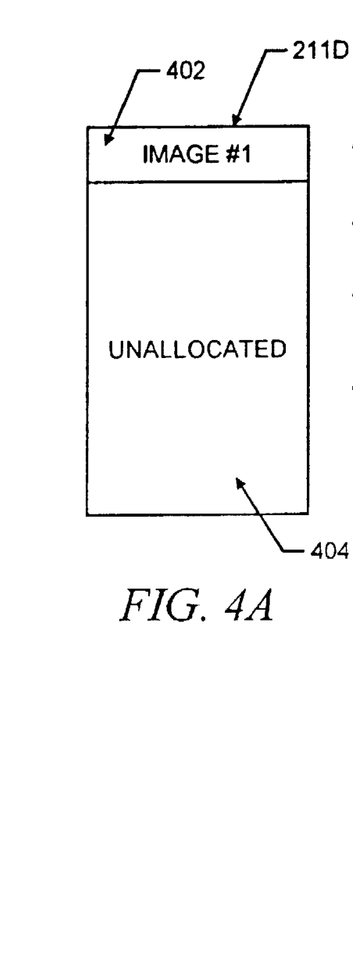
FIGS. 4A–4D are pictorial illustrations of the off-screen display memory partitioned into allocated and unallocated regions.

FIG. 4A illustrates the off-screen video memory 211D partitioned into an allocated region 402 for video image #1 and an unallocated region 404. This represents the first allocation in response to an allocation request from the requesting software 205. The linked list structure indicative of this partitioning of memory would contain two elements. Since the allocated region 402 is smaller than the region 404, the first element in the linked list 302 (FIG. 3) would correspond to the allocated region 402 of memory. The allocated region 402 would contain the necessary amount of contiguous memory locations to satisfy the requested amount. The second element in the linked list would contain the starting address for the unallocated region 404, along with the size of the unallocated region and a boolean status flag indicating that the region is unallocated.

Figure 4B:
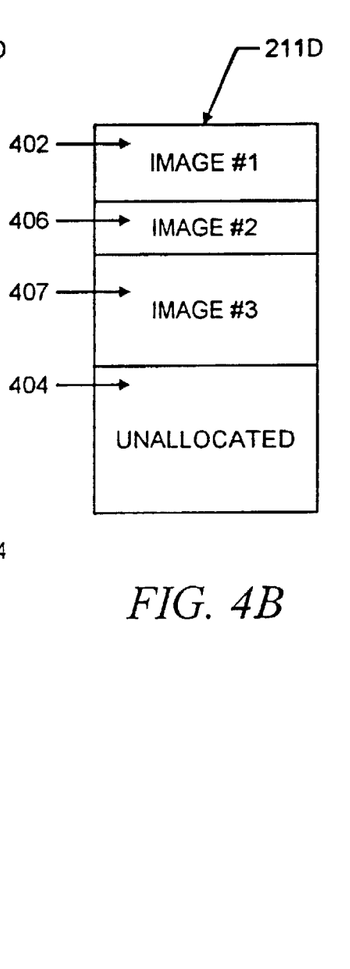

Assuming two more allocation requests have been received and performed without a deallocation request, FIG. 4B illustrates the off-screen video memory 211D partitioned into regions 402, 406–407 for storing video images #1–#3 respectively. The linked list 302 (FIG. 3) for this partitioning would include four elements; one for each of the allocated regions 402,406–407 and one for the unallocated region 404. Each element would include its respective region's size, the regions starting address and a status flag indicative of whether or not the region is allocated or unallocated.

Figure 4C:
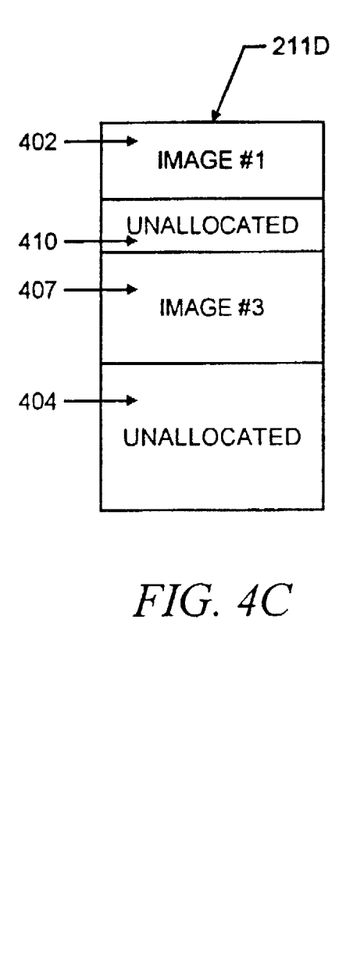

FIG. 4C illustrates the partitioning of off-screen video memory 211D (FIG. 2) following the deallocation of the region 406 (FIG. 4B) for digitized image #2 such that two distinct contiguous regions 404, 410 are now available for allocation. The linked list for the partitioning of FIG. 4C will include five elements; one element for each of the allocated regions 402, 407 along with an element for each of the unallocated regions 404, 410 and an element indicative of the combination of the unallocated regions 404, 410. Since the linked list 302 is arranged in ascending order according to size, the first element in the linked list 302 for the regions 402, 404, 407, 410 illustrated in FIG. 4C would be unallocated region 410 since it is the smallest. The second element in the linked list 302 would correspond to the allocated region 402 for image #1 and third element in the list would correspond to allocated region 407. Note, as shown in FIG. 4C allocated region 407 for image #3 is greater than allocated region 402 for image #1. The fourth element in the list is associated with unallocated region 404 and the fifth and final element in the linked list would correspond to the combination of unallocated regions 404, 410.

Figure 4D:
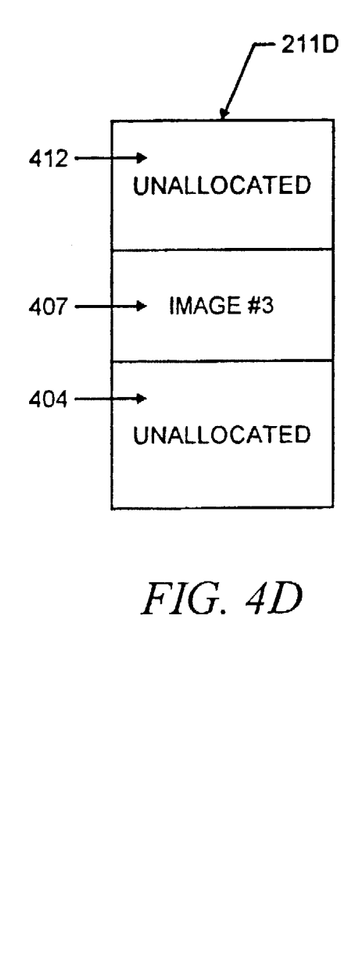

FIG. 4D illustrates the partitioning of the off-screen display memory 211D following the deallocation of the region 402 for storing digitized image #1. The linked list for this partitioning will contain four elements; one for the allocated region 407 for image #3, one for each unallocated contiguous regions 404,412 and one for the combination of the unallocated regions 404,412. Note, since the status of region 402 (FIG. 4C) was changed to unallocated and the region was contiguous with unallocated region 410 (FIG. 4C), the two region were combined into a larger unallocated region 412. The processing of the off-screen display memory manager 203A (FIG. 2) will now be presented in the form of an example.

Figure 5A:
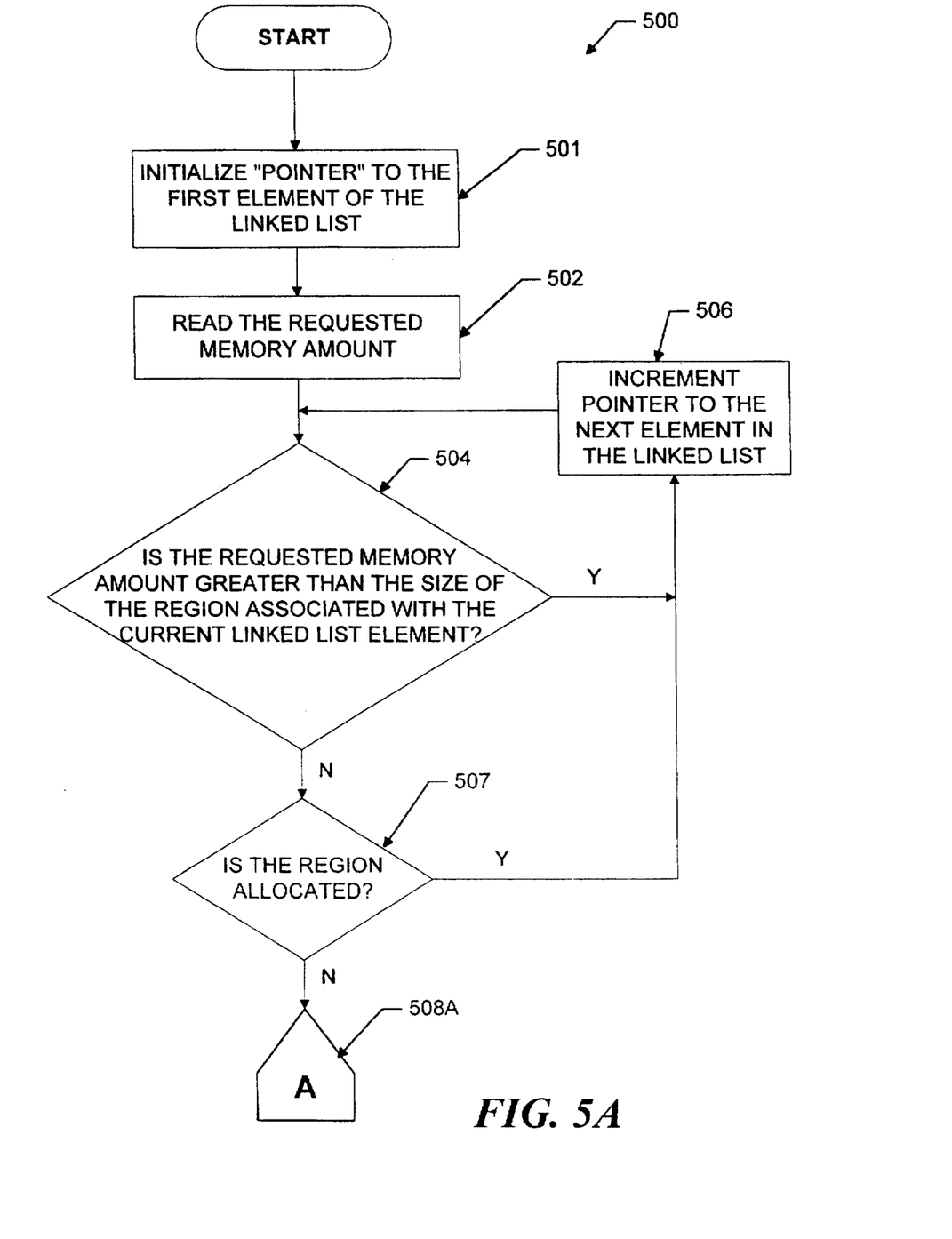
FIGS. 5A–5B together form a flow chart of the off-screen display memory allocation process.
Figure 5B:
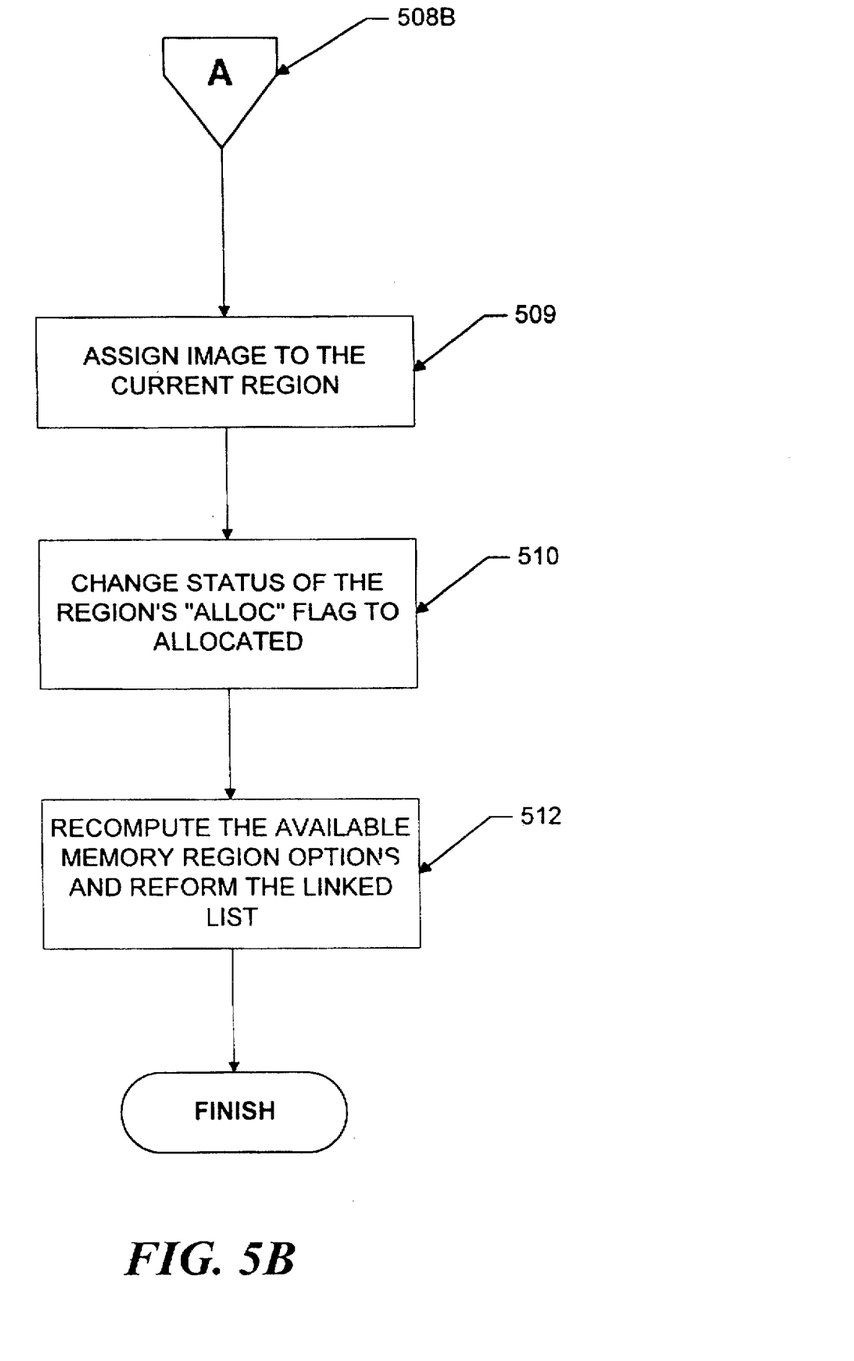

FIGS. 5A–5B together form a flow chart of a memory allocation routine 500 of the present invention which is preferably part of the off-screen display memory manager 203 A (FIG. 2). Referring to FIG. 5A, the routine 500 includes a first step 501 which initializes a pointer to the first element in the linked list 302 (FIG. 3) since the list is arranged from smallest region to largest region. The next step 502 reads the requested allocation amount. A test 504 then checks the first element in the linked list to determine if the size of the first region is large enough to satisfy the requested allocation. If not, then the linked list pointer is incremented by a step 506 and the test 504 is re-executed for the new element. If the region is large enough, then a test 507 is performed to determine if the region is allocated. If the region is allocated then the processing returns to step 506, otherwise the processing continues via off page connectors 508A, 508B.

Referring now to FIG. 5B, once an unallocated region of sufficient size has been located, the routine proceeds via off-page connectors 508A and 508B to step 509 the image is assigned to the allocated region (or combination of regions). A step 510 is then performed to change the Boolean status flag of the status element indicative of the region to "allocated" status. Since a region has been allocated, the various combinations formed by the unallocated regions is recomputed by step 512 and the new combinations stored in the linked list. That is, the linked list 302 (FIG. 3) is updated to match the current state of the off-screen video memory 211B (FIG. 2B).

Figure 6:
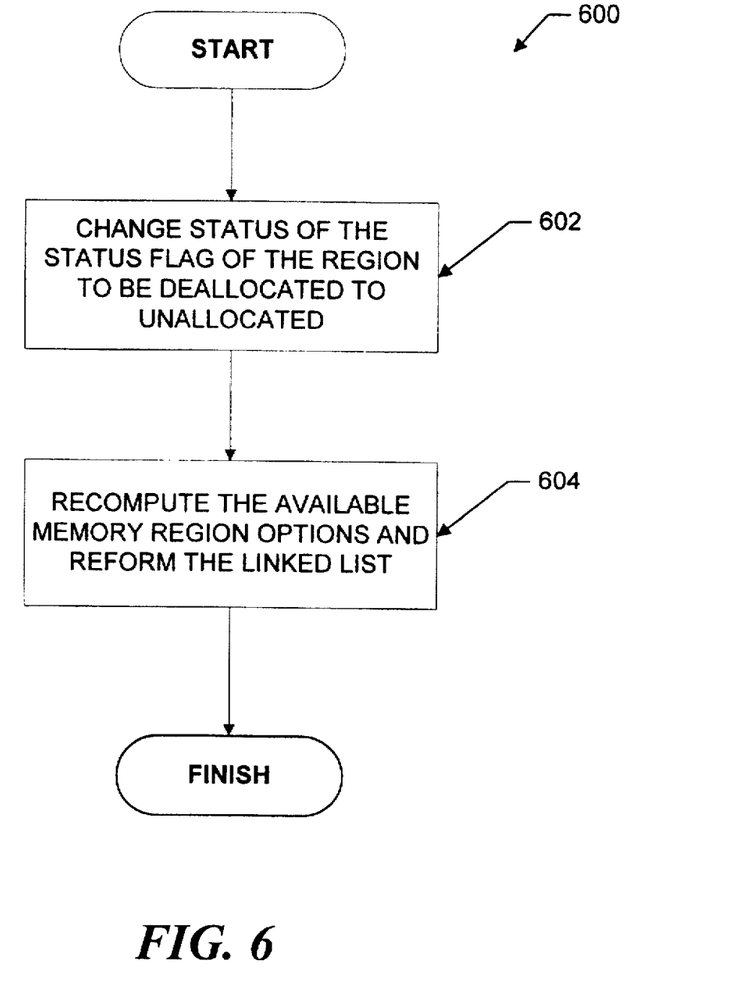
FIG. 6 is a flow chart of the off-screen display memory deallocation process.

FIG. 6 illustrates a flow chart for a routine 600 for deallocating off-screen video memory regions. Upon receiving a deallocation request from the requesting software 205 (FIG. 2) the routine 600 performs a step 602 to change the boolean status flag in the linked list element corresponding to the region to "unallocated" status. The next step in the routine is a step 604 which updates the linked list with the new combinations of unallocated regions and reforms the linked list so the elements are arranged from smallest region to largest region. The step 604 of reforming includes combining contiguous unallocated regions into a single unallocated region, to avoid fragmentation of the unallocated regions. That is, if several non-contiguous unallocated regions are located in off-screen display memory, the deallocation process will attempt to combine the non-contiguous regions by moving the contents of the allocated regions.

One of ordinary skill in the art will recognize that the linked list can be searched in descending order rather than the ascending order discussed herein. That is, with the linked list arranged according to size, the first element in the linked list which is checked may be the element associated with the largest size combination of unallocated regions. The linked list would then be traversed from largest to smallest until the first region which is smaller than the size of the requested region is found. The digitized video image data may then be stored in the next largest region since it represents the smallest region large enough to store the information.

In addition, the present invention is not limited to sequentially linked list data structures as shown in FIG. 3. It is contemplated that the allocation and deallocation procedure of the present invention may also arrange the linked list elements in any other structure such as a tree structure to facilitate the allocation and deallocation.

Furthermore, although VRAM is the preferred display memory, one of ordinary skill will certainly appreciate that the display memory management techniques of the present invention are also applicable to any other display memory technology, such as DRAM. If the designer wishes to avoid the memory refresh SRAM may be used, although such devices are typically less dense and more expensive than VRAM and DRAM. A designer may also use a mixed memory arrangement As an example, VRAM would be used for on-screen display memory, while DRAM or SRAM would be used for off-screen display memory.

Although the present invention has been discussed in the context of a bit mapped display format, the present invention is clearly not so limited. The allocation/deallocation techniques of the present invention are equally applicable to systems using the pixel-packed display format. In addition, each region of allocated off-screen video memory may be allocated as either a "private" or "shared" region, and each linked element (e.g., 304) may contain an additional field to indicate whether allocated regions have been allocated as a "private" region or a "shared" region.

Although the present invention has been shown and described with respect to a preferred embodiment thereof, it should be understood by those skilled in the art that various other changes, omissions and additions to the form and detail thereof, may be made therein without departing from the spirit and scope of the invention.

In an alternate embodiment, the invention may be implemented as a computer program product for use with a computer system. Such implementation may comprise a series of computer readable instructions either fixed on a tangible medium, such as a computer readable media, e.g. diskette 110B, CD-ROM 109B, ROM 104, or fixed disk 113B (FIG. 1), or transmittable to a computer system, via a modem or other interface device, such as network adapter 98 connected to network 96, over either a tangible medium, including but not limited to optical or analog communications lines, or intangibly using wireless techniques, including but not limited to microwave, infrared or other transmission techniques. The series of computer readable instructions embodies all or part of the functionality previously described herein with respect to the invention. Those skilled in the art will appreciate that such computer readable instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software; preloaded with a computer system, e.g., on system ROM or fixed disk, or distributed from a server or electronic bulletin board over a network, e.g., the Internet or World Wide Web.

What is claimed is:

1. A method of allocating and deallocating off-screen display memory in a computer system, comprising the steps of:

A. receiving a request for a region of off-screen display memory to store a digitized image data;

B. traversing a linked list data structure of off-screen display memory regions organized from a smallest-sized region to a largest-sized region to select a region of unallocated off-screen display memory large enough to store the digitized image data;

C. storing the digitized image data in the selected region;

D. updating the linked list data structure to indicate that the selected region of off-screen display memory is now allocated; and E. recomputing the various combinations for the remaining unallocated regions of the off-screen display memory and storing the new combinations in the linked list data structure and reorganizing the linked list data structure from a smallest-sized region to a largest-sized region.

2. The method of claim 1, further comprising the steps of:

F. receiving a request to deallocate a region of the off-screen display memory;

G. traversing the linked list data structure to select the element in the linked list indicative of the region in the off-screen display memory to be deallocated; and H. updating the selected linked list element indicative of the off-screen display memory region to be deallocated to indicate that the region is no longer allocated.

3. The method of claim 2 wherein step D further comprises the steps of:

D2. storing the starting address of the allocated off-screen display memory region in an address field on the linked list element; and D3. storing the size of the allocated region in a size field of the linked list element.

4. The method of claim 1, wherein step D. comprises the step of:

D1. storing the starting address of the allocated region in a field in the linked list data structure element.

5. The method of claim 1 wherein the steps of the present invention are performed by an operating system of a multimedia multi-tasking computer system.

6. The method of claim 1, wherein the linked list data structure comprise a plurality of linked elements each associated with at least one unallocated region and step B comprises B1 selecting the element associated with the largest sized combination of unallocated regions B2 progressing from element to element in the order of descending sized regions, and B3 selecting the selected region is the smallest region large enough to store the digitized video image.

7. A computer system off-screen display memory manager which allocates regions of unallocated off-screen display memory in response to a request for off-screen display memory storage, comprising:

A. a memory device containing off-screen video memory for storing digitized data;

B. apparatus which maintains a linked list data structure containing elements indicative of the current state of said memory device wherein each element includes a field indicative of the size of the allocated and unallocated memory regions within said memory device and the starting address of each region along with a status flag indicative of whether the region is allocated or unallocated, said linked list data structure organized from a smallest-sized memory region to a largest-sized memory region; and C. means for searching the linked list data structure in order to select the smallest unallocated region of said memory device larger than the size of the request for off-screen display memory storage and storing the image into the selected unallocated region of said memory device and updating the linked list data structure to indicate that the selected region is now allocated and reorganizing the linked list data structure from a smallest-sized memory region to a largest-sized memory region.

8. The off-screen display memory manager of claim 7 wherein said electronic memory device is VRAM.

9. The off-screen display memory manager of claim 8 further comprising:

a deallocating means for deleting an dement in said linked list data structure in response to a deallocation request of a memory region within said memory device, and for reforming said linked list data structure to ensure that said linked list is indicative of the current state of said memory device.

10. The off-screen display memory manager of claim 9 wherein said memory device is DRAM.

11. A method of allocating and deallocating off-screen display regions in a memory device which stores digitized information in a multi-tasking computer system, comprising the steps of:

A. receiving an allocation request for a region of the electronic memory device;

B. providing a linked list data structure comprises elements each corresponding to a region of the memory device, and wherein each element includes information fields indicative of starting location of the region, size of the region and whether the region is allocated or unallocated;

C. arranging the elements in the linked list data structure from smallest region to largest region;

D. traversing the elements of the linked list data structure to locate the smallest unallocated region in the memory device whose size is larger than the size of the allocation request;

E. storing the digitized data in the located region;

F. updating the linked list data structure to indicate that the selected region of the memory device is now allocated; and G. resorting the elements in the linked list data structure to ensure that the element associated with the smallest region in the memory device is the first element in the linked list and remaining elements are arranged on the basis of their size in ascending order.

12. The method of claim 11, further comprising the steps:

H. changing the status of a region in the memory device from allocated to unallocated in response to a deallocation command;

I. reforming the linked list by merging any adjacent unallocated regions; and

J. rearranging the elements of the linked list to ensure that the elements are arranged from smallest to largest region.

13. A computer program product comprising:

a computer usable medium having computer readable code means embodied thereon for allocating and deallocating off-screen display memory in a computer system, said program code means comprising:

program code means for receiving a request for a region of off-screen display memory to store a digitized image data;

program code means for traversing a linked list data structure of off-screen display memory regions organized from a smallest-sized region to a largest-sized region to select a region of unallocated off-screen display memory large enough to store the digitized image data;

program code means for storing the digitized image data in the selected region;

program code means for updating the linked list data structure to indicate that the selected region of off-screen display memory is now allocated; and program code means for recomputing the various combinations for the remaining unallocated regions of the off-screen display memory and storing the new combinations in the linked list data structure and for reorganizing the linked list data structure from a smallest-sized region to a largest-sized region.

14. The computer program product of claim 13, further comprising:

program code means for receiving a request to deallocate a region of the off-screen display memory;

program code means for traversing the linked list data structure to select the element in the linked list indicative of the region in the off-screen display memory to be deallocated; and program code means for updating the selected linked list element indicative of the off-screen display memory region to be deallocated to indicate that the region is no longer allocated.

15. The computer program product of claim 14 wherein said program code means for updating the linked list data structure further comprises:

program code means for storing the starting address of the allocated off-screen display memory region in an address field on the linked list element; and program code means for storing the size of the allocated region in a size field of the linked list element.

16. The computer program product of claim 13 wherein said program code means for updating the linked list data structure further comprises:

program code means for storing the starting address of the allocated region in a field in the linked list data structure element.

17. The computer program product of claim 13 in combination with documentation.

18. A computer program product for use in a computer system having off-screen display memory, the computer program product comprising:

a computer usable medium having computer readable program code means for allocating and deallocating the off-screen display memory, the program code means comprising:

first program code means for receiving a request for a region of off-screen display memory to store a digitized image data;

second program code means for traversing a linked list data structure of off-screen display memory regions organized from a smallest-sized region to a largest-sized region to select a region of unallocated off-screen display memory large enough to store the digitized image data;

third program code means for storing the digitized image data in the selected region;

fourth program code means for updating the linked list data structure to indicate that the selected region of off-screen display memory is now allocated; and fifth program code means for recomputing the various combinations for the remaining unallocated regions of the off-screen display memory and storing the new combinations in the linked list data structure and for reorganizing the linked list data structure from a smallest-sized region to a largest-sized region.

19. The computer program product of claim 18, wherein the computer readable program code means further comprises:

sixth program code means for receiving a request to deallocate a region of the off-screen display memory;

seventh program code means for traversing the linked list data structure to select the element in the linked list indicative of the region in the off-screen display memory to be allocated; and eighth program code means for updating the selected linked list element indicative of the off-screen display memory region to be deallocated to indicate that the region is no longer allocated.

20. The computer program product of claim 19 wherein the fourth program code means further comprises program code means for storing a starting address of the allocated off-screen display memory region in an address field on the linked list; and program code means for storing the size of the allocated region in a size field of the linked list.

21. The computer program product of claim 18, wherein the fourth program code means comprises program code means for storing a starting address of the allocated region in a field in the linked list data structure.

* * * * *

UNITED STATES PATENT AND TRADEMARK OFFICE
CERTIFICATE OF CORRECTION

PATENT NO. : 5,742,797
DATED : April 21, 1998
INVENTOR(S) : Celi, Jr. et al.

It is certified that error appears in the above-identified patent and that said Letters Patent is hereby corrected as shown below:

Column 10, line 10: change "dearly" to --clearly--

Column 12, line 7: change "dement" to --element--

Signed and Sealed this

Fourth Day of August, 1998

*Attest:*

BRUCE LEHMAN

*Attesting Officer*    *Commissioner of Patents and Trademarks*